Patented Jan. 29, 1952

UNITED STATES PATENT OFFICE 2,583,574

ACROLEIN AND SULFUR HALIDE PROCESS TO STRENGTHEN PROTEIN FIBERS

Harrison W. Jones, Berkeley, Walter J. Thorsen, Napa, and Harold P. Lundgren, Berkeley, Calif., assignors to the United States of America as represented by the Secretary of Agriculture No Drawing. Application August 30, 1949, Serial No. 113,242

2 Claims. (Cl. 8—127.6)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the treatment of protein fibers which may be natural protein fibers such as wool, silk, hair, fur, etc. or synthetic protein fibers such as those prepared from natural proteins as, for example, feathers, horn, hair, hoof, egg white, zein, casein, soybean protein, etc. Synthetic protein fibers are generally prepared by dispersing the native protein in suitable solvents and then forming fibers from the resulting dispersion by extrusion through spinnerets into a precipitating bath. One method of preparing such synthetic keratin fibers is set forth in U. S. Patent 2,425,550 to Harold P. Lundgren.

It is known that protein fibers consist of protein molecules which in turn consist of various amino acids linked through amide (peptide) linkages to form long chain structures called polypeptides. The individual properties of the various protein fibers are caused by variations in the proportion of the different amino acids and the arrangements by which they are joined together. Other factors are varying chain length, degree of cross-linking between polypeptide chains and the presence of groups and linkages other than the basic peptide linkages. Thus, for example, keratins differ from most other proteins in that they contain a relatively high content of disulphide (cystine) linkages. In many cases, protein fibers are deficient in their tensile strength because there is insufficient cross-linking between the polypeptide chains.

This invention relates primarily to the treatment of protein fibers to cause chemical modification of the protein molecules whereby in many cases the fiber becomes stronger. This increase in strength is believed to be caused by formation of additional cross-linking between the polypeptide chains which make up the protein molecule.

The treatment, or chemical modification, according to this invention involves essentially two steps. In the first step, the fiber is reacted with acrolein at a temperature from about 4° C. to about 120° C. chemically to combine acrolein with the fiber. The fiber is then treated with a sulphur halide at a temperature from about 20° C. to about 120° C., probably to establish cross-linking through sulphur linkages. The complete treatment causes the chemical modification desired without altering the physical form of the fiber so that the general shape of the fiber is retained in the process, whereas its chemical composition is modified.

The chemical basis of our process may be explained as follows: The polypeptide chains which make up the protein molecule have free amino ($NH_2$—) or imino (—NH—) groups—the number of these depending on the particular protein. Keratin, for example, contains lysine, tryptophane and histidine residues, all of which contain amino or imino groups and which are centers for reaction with acrolein and subsequent cross linking either by treatment to cause polymerization of exposed vinyl residues or by treatment with sulphur halides to couple vinyl residues through sulphur linkages. Thus in the first step of our process the acrolein reacts with some of the reaction centers whereby the acrolein radical becomes attached as an alpha hydroxy allyl radical. The mechanism of the reaction may be represented by the following equations:

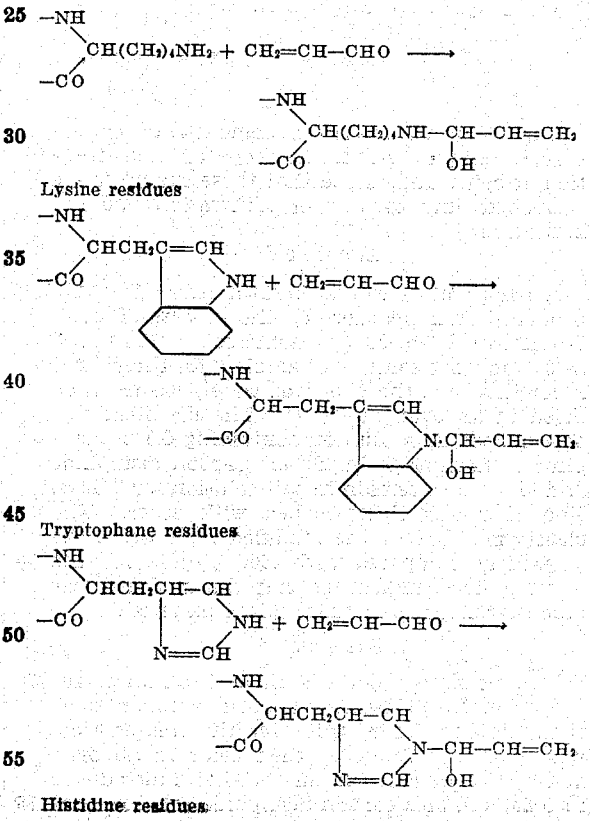

Thus the products produced by the reaction of acrolein with the protein can be represented by the formula:

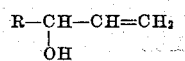

wherein R represents the polypeptide chain of the protein.

In the treatment of the acrolein-treated fiber with a sulphur halide, the acrolein-substituted polypeptide chains are probably cross-linked through sulphur. The mechanism for this cross-linking is not known exactly and it may occur in any of the following ways, or combinations of several of them (assuming that sulphur monochloride is used as the cross-linking agent), thus:

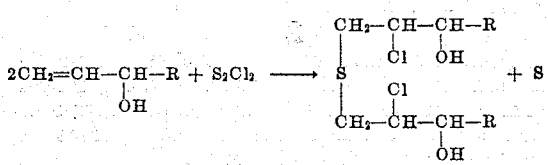

or

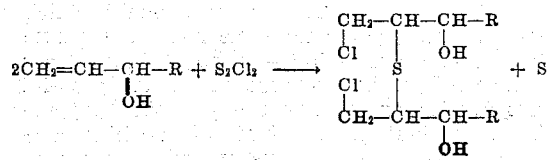

or

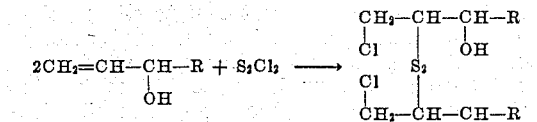

or

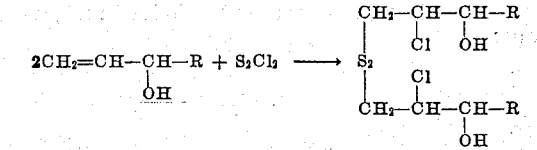

The following examples demonstrate particular techniques within the scope of this invention, it being understood that these examples are furnished only by way of illustration and not limitation.

Example I

A length of synthetic keratin fiber (1 gram) produced from feathers by the process of U. S. Patent No. 2,425,550 was immersed in 100 ml. of a 23% aqueous solution of acrolein for three days. After this time the fiber was water-washed then dried in an oven at 60° C. The dry fiber was then placed in a solution containing 0.5 ml. sulphur monochloride in 100 ml. carbon disulphide and allowed to remain in this solution for 3 days. The fiber was then washed with ether. The elastic modulus of the modified fiber was 1.623 g./grex as compared with .866 g./grex for the original fiber, indicating that the modified was much stronger than the original material.

Example II

Five grams of wool was allowed to remain for 3 days in 50 ml. of 20% aqueous acrolein solution. At the end of this time the treated wool was washed with water then dried in an oven at 60° C. The resulting material was introduced into 250 ml. of a carbon disulphide solution containing 2 ml. of sulphur monochloride and allowed to remain in the solution for 2 days. The fiber was then washed successively with ether and water and then air dried. Analysis:

|  | Total nitrogen by Kjeldahl method Per Cent | Amino nitrogen by Van Slyke method Per Cent | Sulphur Per Cent | Chlorine Per Cent |
| --- | --- | --- | --- | --- |
| Original wool | 16.66 | 0.28 | 3.56 | |
| Product of Ex. II | 13.09 | 0.08 | 3.61 | 0.91 |

Example III

A batch of wool was divided into 1 gram samples and each sample was treated with 50 ml. of a 20% aqueous acrolein solution under various conditions of time and temperature. The treated samples were then washed with water and dried in an oven at 60° C. The following table shows the conditions employed and the analysis of the products.

| Expt. No. | Time of treatment days | Temp. of treatment °C. | Total nitrogen content (Kjeldahl) Per Cent | Amino nitrogen content (Van Slyke) Per Cent |
| --- | --- | --- | --- | --- |
| 1 | (¹) | | 16.2 | 0.29 |
| 2 | 1 | 4 | 14.9 | 0.08 |
| 3 | 3 | 4 | 14.03 | 0.08 |
| 4 | 7 | 4 | 13.12 | 0.15 |
| 5 | 1 | 20 | 13.61 | 0.10 |
| 6 | 3 | 20 | 12.77 | 0.09 |
| 7 | 7 | 20 | 13.37 | 0.13 |
| 8 | 1 | 40 | 13.15 | 0.05 |
| 9 | 3 | 40 | 12.88 | 0.12 |
| 10 | 7 | 40 | 12.58 | 0.17 |

¹ None (control).

The products prepared as above set forth were suitable for further treatment as by polymerization or by reaction with a sulphur halide as described herein.

Generally a large excess of acrolein, i. e., at least 0.1 part acrolein per part of fiber, is used in the first step of our process. The unreacted acrolein can be readily recovered from the treating solution and/or wash water by distillation or other suitable method. The acrolein is applied to the fiber preferably in the form of a solution in water or an alcohol. A water solution is convenient to use, especially a saturated solution which is about 29% concentration, but a weaker solution, as low as about 20% concentration, may be employed. The temperature of the reaction is not critical as long as it is below about 120° C., higher temperatures being destructive to the fiber. The time of reaction is dependent on the temperature so that whereas 1 day will be required for substantially complete reaction at 20°, at 50° C., the reaction will be virtually complete in 5 hours. Accordingly, we prefer to use a temperature from about 4° C. to about 120° C. and correlate the time of reaction with the temperature to obtain complete reaction, i. e., maximum addition of acrolein to the protein molecule.

Although sulphur monochloride is the preferred reagent to be used in the sulphur halide treatment, one can use sulphur dichloride, sulphur monobromide, sulphur dibromide, and so forth. The sulphur halide reagent is employed in excess, i. e., at least 0.1 part per part of protein, since the excess causes more rapid reaction and the unreacted reagent can easily be recovered and re-used. The temperature of reaction is not critical as long as it is below about 120° C., since higher temperatures like in the acrolein treatment step tend to be destructive to the fiber. Generally temperatures from about 20° C. to about 120° C. are employed, the time of reaction being correlated with the temperature since the speed of the reaction is greater at the higher temperature. The sulphur halide is preferably applied in solution form, suitable inert, organic solvents being disulphide, carbon tetrachloride, trichloroethylene, ethylene dichloride or any other inert solvent for the reagent.

The process of this invention can be applied to the fibers in any form. Thus the fibers may be in long continuous filaments or as staple or chopped fiber. The fibers may also be previously woven or knitted into textile goods. One convenient method for carrying out this invention when it is applied to synthetic protein fibers is to pass the fiber directly from the spinning and washing treatments into a bath of acrolein and then into a heated bath or a bath of the sulphur halide. If desired, the fiber may be subjected to twisting and/or stretching operations before or after the chemical modification.

Having thus described our invention, we claim:

1. A process for the chemical modification of protein fibers which comprises impregnating the fiber with an aqueous solution of acrolein having a concentration from about 20% to saturation at a temperature from about 4° C. to about 120° C. to chemically combine acrolein with the fiber, washing and drying the fiber, then impregnating it with a solution of sulphur halide in an inert, organic solvent at a temperature from about 20° C. to about 120° C.

2. The process of claim 1 wherein the protein fiber is a keratin fiber and wherein the sulphur halide is sulphur monochloride.

HARRISON W. JONES.
WALTER J. THORSEN.
HAROLD P. LUNDGREN.

REFERENCES CITED

The following references are of record in the file of this patent:

UNITED STATES PATENTS

| Number | Name | Date |
|---|---|---|
| 2,189,481 | Traill | Feb. 6, 1940 |
| 2,342,994 | Atwood | Feb. 29, 1944 |
| 2,383,963 | Gottfried | Sept. 4, 1945 |